(12) United States Patent
Kapur

(10) Patent No.: US 8,095,419 B1
(45) Date of Patent: Jan. 10, 2012

(54) SEARCH SCORE FOR THE DETERMINATION OF SEARCH QUALITY

(75) Inventor: Shyam Kapur, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 746 days.

(21) Appl. No.: 11/253,056

(22) Filed: Oct. 17, 2005

(51) Int. Cl.
*G06Q 30/00* (2006.01)
*G06F 7/00* (2006.01)
*G06F 17/30* (2006.01)

(52) U.S. Cl. .................. 705/14.2; 707/748

(58) Field of Classification Search .......... 707/3, 5, 707/E17.108, 10, 999.005, 748, 751; 705/14.2
See application file for complete search history.

(56) References Cited

U.S. PATENT DOCUMENTS

| | | | |
|---|---|---|---|
| 5,640,553 A * | 6/1997 | Schultz | 707/5 |
| 6,879,967 B1 * | 4/2005 | Stork | 706/12 |
| 6,892,198 B2 * | 5/2005 | Perisic et al. | 707/5 |
| 7,181,438 B1 * | 2/2007 | Szabo | 707/2 |
| 7,216,121 B2 * | 5/2007 | Bachman et al. | 707/3 |
| 7,346,839 B2 * | 3/2008 | Acharya et al. | 707/3 |
| 7,660,737 B1 * | 2/2010 | Lim et al. | 705/14.49 |
| 7,725,526 B1 * | 5/2010 | Kraft | 709/203 |
| 2002/0120712 A1 * | 8/2002 | Maislin | 709/217 |
| 2002/0143759 A1 * | 10/2002 | Yu | 707/5 |
| 2002/0160825 A1 * | 10/2002 | Nicastro et al. | 463/16 |
| 2003/0009448 A1 * | 1/2003 | Covington et al. | 707/3 |
| 2003/0009451 A1 * | 1/2003 | Bates et al. | 707/3 |
| 2003/0046281 A1 * | 3/2003 | Son | 707/6 |
| 2003/0167263 A1 * | 9/2003 | Sasaki et al. | 707/3 |
| 2003/0177127 A1 * | 9/2003 | Goodwin et al. | 707/10 |
| 2006/0015488 A1 * | 1/2006 | Perisic et al. | 707/3 |
| 2006/0064403 A1 * | 3/2006 | Rechterman et al. | 707/3 |
| 2006/0111974 A1 * | 5/2006 | Nashed | 705/14 |
| 2006/0136377 A1 * | 6/2006 | Patt-Shamir et al. | 707/3 |
| 2006/0224554 A1 * | 10/2006 | Bailey et al. | 707/1 |
| 2007/0203906 A1 * | 8/2007 | Cone et al. | 707/6 |
| 2008/0222000 A1 * | 9/2008 | Berstis et al. | 705/14 |

OTHER PUBLICATIONS

Gordano, "Gordano Knowledge Base Article Q0234" http://web.archive.org/web/20030404155229/http://www.gordano.com/kb.htm?q=234.*
Gordano, "Gordano Knowledge Base Article Q0234", 2003, http://web.archive.org/web/20030404155229/http://www.gordano.com/kb.htm?q=234.*
Aktas et al, "Personalizing PageRank Based on Domain Profiles", 2004, Proceedings of the sixth WEBKDD workshop.*
Speretta et al, "Personalized Search Based on User Search Histories", 2005, Proceedings of the 2005 IEEE/WIC/ACM International Conference on Web Intelligence (WI'05).*

* cited by examiner

*Primary Examiner* — Mohammad Ali
*Assistant Examiner* — Brannon W Smith
(74) *Attorney, Agent, or Firm* — Seth H. Ostrow; Ostrow Kaufman LLP

(57) ABSTRACT

The present invention relates to systems and methods for the generation and presentation of a search score for a given user on the basis of searches that the user performs over a corpus of documents. The method of present invention comprises selecting a given user and a time period over which to calculate the search score. A score function is applied to information regarding past observed queries for the given user over the time period to calculate a search score for the given user. The search score is displayed to the user in a variety of context using a number of software applications.

20 Claims, 6 Drawing Sheets

SEARCH SCORE FOR THE DETERMINATION OF SEARCH QUALITY

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The invention disclosed herein relates generally to a system and method for scoring one or more searches conducted over a corpus of documents. More particularly, the present invention relates to systems and methods for generating and presenting a search score in a variety of contexts for a given user on the basis of searches that the user performs over a corpus of documents over a period of time.

Many web forums, such as message boards and the like, have implemented techniques for informing a given user of the experience associated with other users, as well as the given user himself or herself. For example, some web forums associate a rank with a given user that indicates how active the user is in the forum, such as a novice, intermediate or expert. The activity raking provides other users with an indication of the given user's activity, which may be useful in deciding whether to approach a user for advice, etc.

Another context in which ranking has played an important role is in massively multiplayer on-line role playing games ("MMORPG"). A typical MMORPG is an on-line game in which the user assumes the role of a character in a digital universe. One aspect of the digital character is a rank. Using the character, a given user explores the digital universe, interacts with other users and completes objectives, which results in the character's rank increasing. Other users utilize a given character's rank to establish assumptions about the character and how to proceed with an interaction. Also, the use of a ranking system in a MMORPG improves engagement and retention as users compete to outdo other players with increasingly higher ranks.

In comparison with other on-line experiences, conducting on-line searching lacks a mechanism for indicating a user's rank. When formulating searches over a corpus of document, such as a web search, users lack an indication regarding the quality of the searches that they are formulating. Users formulating searches also lack an indication of the quality of searches that other users are formulating, in addition to the quality of their searches vis-à-vis other users, e.g., a rank based on a search score. Systems and methods are therefore needed to provide a score to a user indicating the quality of the searches that they are conducting though interaction with a search engine, which may also be presented to other users of the search engine, as well as through the use of other applications. A scoring mechanism is further needed that improves engagement and retention with a given search engine.

SUMMARY OF THE INVENTION

The present invention is directed towards systems and methods for the generation and presentation of a search score for a given user on the basis of searches that the user performs over a corpus of documents. According to one embodiment, the method comprises selecting a given user from a set of one or more users and selecting a time period over which to calculate the search score. A score function is applied to information regarding past observed queries for the given user over the time period to calculate a search score for the given user and the search score is displayed to the user. According to embodiments of the invention, the search score may be presented to the user: upon retrieving a search page from a search engine, receiving a search results page from a search engine, in conjunction with another interface that the search engine provides or through another application or software component. The method of generating and presenting a search score may also comprise applying a time dissipation factor to the search score, such that the search score decays as a function of time.

According to one embodiment, calculating the search score by the application of a search function comprises calculating an average session score over a given number of sessions in the time period, each session comprising one or more attributes of one or more queries. A session is any combination of related queries, e.g. by time, by query revision, etc. Accordingly, a session comprises a number of attributes, each attribute comprising a value. A weight value may also be applied to provide for disparate weighting of the attributes comprising a session. Calculating a score for a session may comprise calculating the sum of the product of a score value for an attribute of a query and a weight for the attribute of the query over one or more attributes. An attribute may include, but is not limited to, a query type, a number of queries in a given session, a number of items that the user selects from a result set for a given query, or a category into which a given query falls.

As indicated above, the search score may be presented to the user or other users in a variety of contexts. According to one embodiment, displaying the search score comprises displaying the search score in conjunction with a search results page. Similarly, displaying the search score may comprise displaying the search score in conjunction with a search query page. In addition to a search score, or alternatively, the user may be presented with a grade that is derived from the search score, e.g., A, B, C, etc.

The method for generating and displaying a search score may also comprise executing a query by the given user through the use of a search query page provided by a search engine and storing one or more attributes of the query in a profile for the given user, the profile maintaining one or more attributes of past observed queries for the given user. A separate profile may be maintained for each user, or a single profile delimited by user may be utilized. The profile for the given user may be retrieved to obtain attributes of past observed queries for the given user. The score function is applied to information regarding past observed queries for the given user to calculate an updated search score for the given user and the updated search score is displayed to the user.

The score calculation function may be exposed to other applications through the use of an API. Other applications may interrogate the API to generate a search score, which is transmitted to the application for display to the user or another user. Alternatively, the search score may be transmitted to another application or component for display to the user or another user.

The invention is also directed towards a system for the generation and presentation of a search score for a given user on the basis of searches that the user performs over a corpus of documents. According to one embodiment, the system of the present invention comprises a search engine operative to receive a query from a user and generate a result set for presentation to the user. A search score component is operative to calculate a search score on the basis of attributes of past observed queries for the given user received from the search engine.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
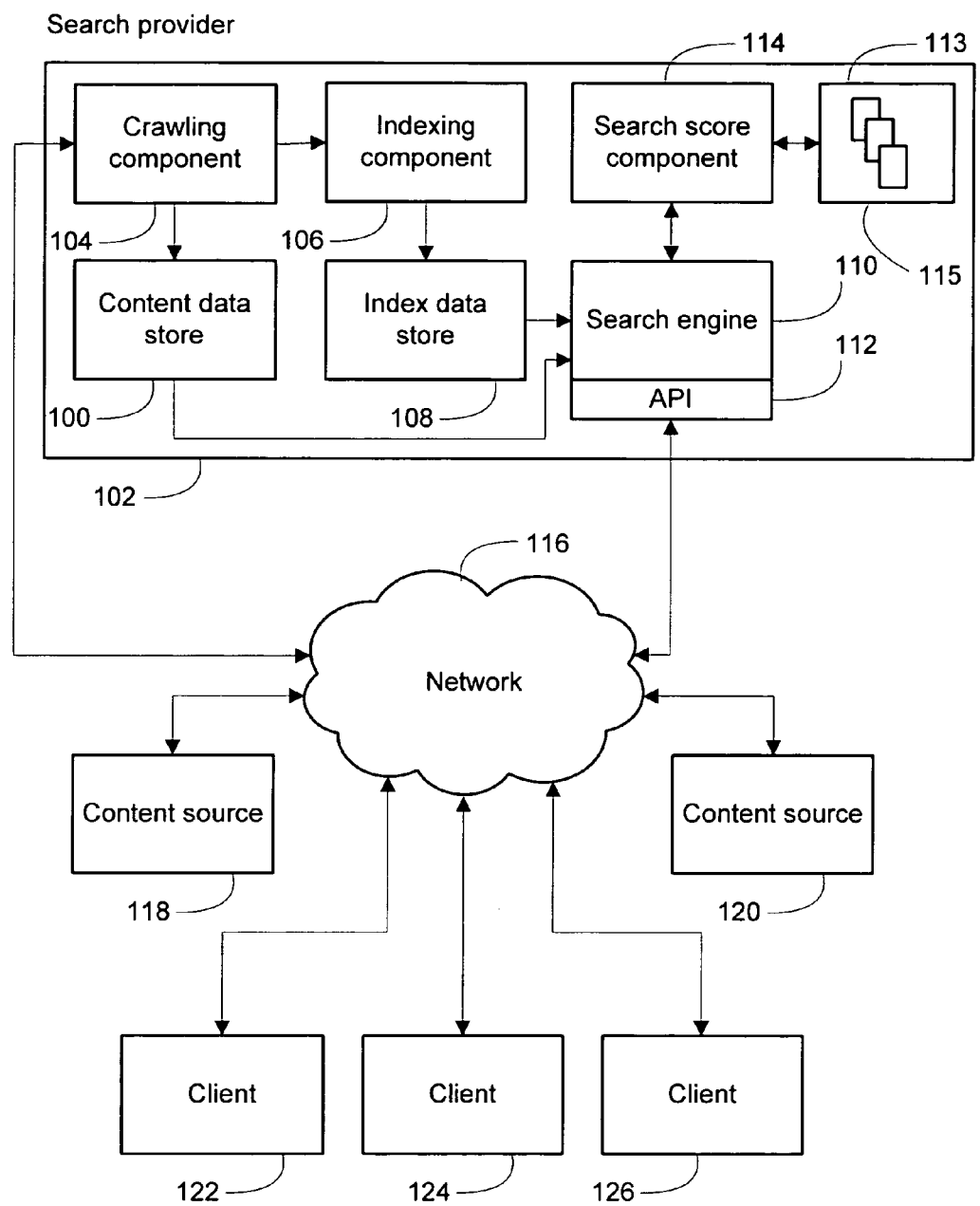
FIG. 1 is a block diagram illustrating a system architecture for the generation and presentation of a search score for a given user on the basis of searches that the user performs over a corpus of documents according to one embodiment of the present invention.

With reference to FIGS. 1 through 6, embodiments of the present invention are shown. FIG. 1 presents a block diagram illustrating the components of a system for generating and presenting a search score for a given user of a search provider 102. Although the embodiment presented in FIG. 1 illustrates these components in a network environment it should be understood that the invention is not limited to networked environments, and may also be implemented on a stand-alone computer or electronic device.

As shown, the system of FIG. 1 includes a search provider 102, a network 116, one or more content sources 118 and 120, and one or more clients 122, 124 and 126. The search provider 102 allows clients 122, 124 and 126 to search for and identify content items of interest that are hosted by the one or more content sources 118 and 120. To allow clients 122, 124 and 126 to search for content items from the one or more content sources, the search provider 102 makes use of a number of components, which may include a crawling component 104, an indexing component 106, an index data store 108, a search score component 114, one or more profiles 113 in a profile data store 115, and a search engine 110, which may expose one or more functions through the use of an application program interface ("API") 112.

The search provider 102 is communicatively coupled with a network 116, which may include a connection to one or more local and/or wide area networks, such as the Internet. Using communication pathways that the network 116 provides, the crawling component 104 is capable of accessing sources of content 118 and 120, as well as information regarding and describing the same, which is referred to herein as metadata. The crawling component 104 communicates with content sources 118 and 120 for maintaining cached copies of the content and metadata in a content data store 100. The collection of content and metadata from content sources 118 and 120 is referred to as "crawling", and is the process by which the crawling component 104 collects information upon which the search engine 110 performs searches. Exemplary methods for crawling information on a network is described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

The crawling component 104 crawls content located on content sources 118 and 120 in communication with the network 116, such as the Internet, collecting content and information regarding the same. An indexing component 106 parses and indexes content and related information that the crawling component 104 collects through the crawling process. The indexing component 106 generates an index that defines a structure for the content and metadata that allows for location and retrieval of the content and metadata. According to one embodiment of the invention, the index component 106 creates an index of word-location pairs that allows a search engine 110 to determine specific items of content and metadata regarding the same in response to a query from a client 122, 124 and 126, which may be from a user, software component, automated process, etc. Exemplary methods for indexing information are described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. Index information that the index component 106 generates is written to an index data store 108 for persistent storage and use by other components of the search provider 102.

The search engine 110 receives search requests from client devices 122, 124 and 126 communicatively coupled to the network 116. A client device 122, 124 and 126 may be any device that allows for the transmission of search requests (a query or query fragment) to a search provider 102, as well as receipt of result sets from the search provider 102. According to one embodiment of the invention, a client device 122, 124 and 126 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 122, 124 and 126 may run software applications, such as a web browser, which provide for transmission of search requests as well as receipt and display of result sets.

When the search engine 110 receives a search request, or query, from a given client 122, 124 and 126, the search engine 110 investigates the index in the index data store 108 to identify content that is responsive to the query that search engine 110 receives. The search engine 110 generates a result set that comprises links to content that falls within the scope of the query. To present the client 122, 124 and 126 with the most relevant items in the result set, the search engine 110 may rank the items in the result set. Exemplary systems and methods for ranking search results are described in commonly owned U.S. Pat. No. 5,765,149, entitled "MODIFIED COLLECTION FREQUENCY RANKING METHOD," the disclosure of which is hereby incorporated by reference in its entirety.

According to the embodiment illustrated at FIG. 1, the search engine 110 is operative to interface with a search score component 114 for the calculation of a search score for the user submitting the search request. The search score component 114 receives the query from the search engine 110, as well as information regarding the user's interaction with the result set that the search engine 110 provides to the client 122, 124 and 126. This information, which may include the query, information regarding the query, and information regarding the user's use of the result set that the search engine 110 generates in response to the query, are collectively referred to as attributes. The search score component 114 stores the attributes in a profile 113 for the user, which the search score component 114 stores in a profile data store 115. The search score component 114 also stores a score or value in the profile for each attribute, which the search score component 114 assigns.

The profile data store 115 maintains one or more profiles 113, each profile 113 corresponding to a given user who may interface with the search provider 102 through the use of a client device 122, 124 and 126. A profile 113 for a given user maintains attributes or information regarding past observed queries that the user submits to the search engine 110. The attributes in a given user's profile may be grouped according to one or more sessions. A session is generally a group of queries that are related in some manner. For example, when a user accesses the search engine 110 over the network 116, the search engine 110 provides the user with a page through which the user may provide a search query to the search engine 110. The search engine 110 receives the query and provides a result set in response for display on a client 122, 124 and 126. The user may review the result set and subsequently refine the query he or she previously provided for execution by the search engine 110 or provide a new query without navigating away from the search engine. These two exemplary queries may be considered as part of a single session and the attributes of the queries may be structured as such in a profile 113 for a given user that the profile data store 115 maintains. Attributes in the profile 113 may further or alternatively be organized according to time, e.g., date and time, etc. Other ways in which queries are related and may be considered as being part of a session should be apparent to those of skill in the art.

In addition to receiving attributes for storage in a profile 113 for a given user, the search score component 114 uses the attributes in a profile 113 for a given user to calculate a search score for the given user. The search score component 114 applies a scoring function to the attributes in a profile for a given user to generate the search score. Put another way, the search score component 114 applies a score function to information regarding past observed queries. According to the present embodiment, the search score is calculated for a given user over a period of time, e.g., the past week. The scoring function that the search score component 114 applies determines the average session score for the sessions that have taken place over the period of time. For each attribute in a session, the search score component 114 calculates the product of the value or score for the attribute by a weighting value for the attribute. The value or score for a given session is a function of the value of the attributes in the session, e.g., the sum of the score of the attributes in a session. The scoring function may also be adjusted according to a time dissipation factor to allow the search score to dissipate over time if additional queries are not submitted by the user to the search provider 102.

To prevent users from "gaming" the search score component 114 to generate artificially high search scores, a sufficiently large number of attributes may serve as inputs to the scoring function to thereby ensure that no single attribute constitutes an overly large proportion of the overall score. Additionally, the search score component 114 may change the weight associated with a given attribute on a random basis over a given time window, such as randomly assigning a weight to an attribute on a weekly basis or randomly determine those weights that are to change in a given time period. For example, assume that a search score is composed of ten attributes and the weights of five of the attributes are assigned randomly on a weekly basis. According to one embodiment, weights for one or more attributes are assigned on a random basis over a time window, but the user receives a search score that is the maximum of the score computed according to the weights in the present time window and the prior time window. This embodiment helps to alleviate user disappointment when the search queries that he or she is using have previously received high search scores.

The search score component 114 calculates a search score for a given user who is accessing the search engine 110 of the search provider 102. The search engine 110 may display the search score for the given user in conjunction with the result set that the search engine 110 returns in response to a query that the user submits to the search engine 110. Alternatively, the search provider 102 is operative to identify a given user accessing the search engine 102. The search provider 102 passes the user identity to the search score component 114, which retrieves the profile identified by the user identity. The search score component 114 uses the profile that it retrieves to calculate a search score for the user and passes the search score to the search engine 110. Alternatively, the search score component 114 may retrieve a pre-computed search score for the given user. The search engine 110 prepares a search page for transmission to the client 122, 124 and 126, including the user's search score. The client 122, 124 and 126 receives the search page that includes the user's search score, as well user interface components that allow the users to formulate and submit a search query to the search engine 110, which the client 122, 124 and 126 displays to the user.

The search engine may also implement an application program interface ("API") 112 to expose the functionality of the search score component to other components that the search provider makes available to clients 122, 124 and 126. For example, where the search provider also implements an instant messaging system, instant messaging clients (not pictured) running on the clients 122, 124 and 126 may interrogate the API 112 to receive a search score for one or more users that are engaging in an instant message conversation. Similarly, where the instant message client maintains a "buddy list", the instant message client may interrogate the API 112 to receive a search score for one or more members on the buddy list. Accordingly, the user viewing his or her buddy list may have an indication regarding the quality of searches being conducted by members on the buddy list.

Other applications may interrogate the API 112 to calculate and receive search scores for users that maintain profiles 113 in the profile data store 115. A leader board is an exemplary use of the API 112 to receive search scores. A leader board component (not pictured) may receive search score information that the component ranks and displays to users, thereby allowing a given user to determine the quality of their searches in comparison to other users. Alternatively, the leader board component may interrogate the API 112 to instruct the search score component 114 to calculate and return the top users, e.g., top 1000 users by search score, the users with search scores above a threshold, those users with the most improved search score in a given time window, users who have had an uninterrupted positive change in their search score over a given number of weeks, etc. This functionality may also be provided by the search engine 110, with the search engine 110 providing a leader board page with the relevant information to the clients 122, 124 and 126.

The search scores for one or more users may also form the basis of a reward system whereby users are rewarded for achieving certain search scores or patterns of search scores. For example, when a user reaches a certain search score, the search engine 110 may provide additional advanced features appropriate only for users with advanced searching skills. Similarly, premium services may be provided free or at a discount. Alternatively, or in conjunction with the foregoing, users may be presented with less advertising content when reaching a certain search score or upon reaching certain search score milestones. Rewards may also encompass winning products whereby users compete with one another to achieve the highest search scores possible. It should be noted by those of skill in the art that other rewards and thresholds for granting rewards are contemplated as falling within the scope of the invention.

Figure 2:
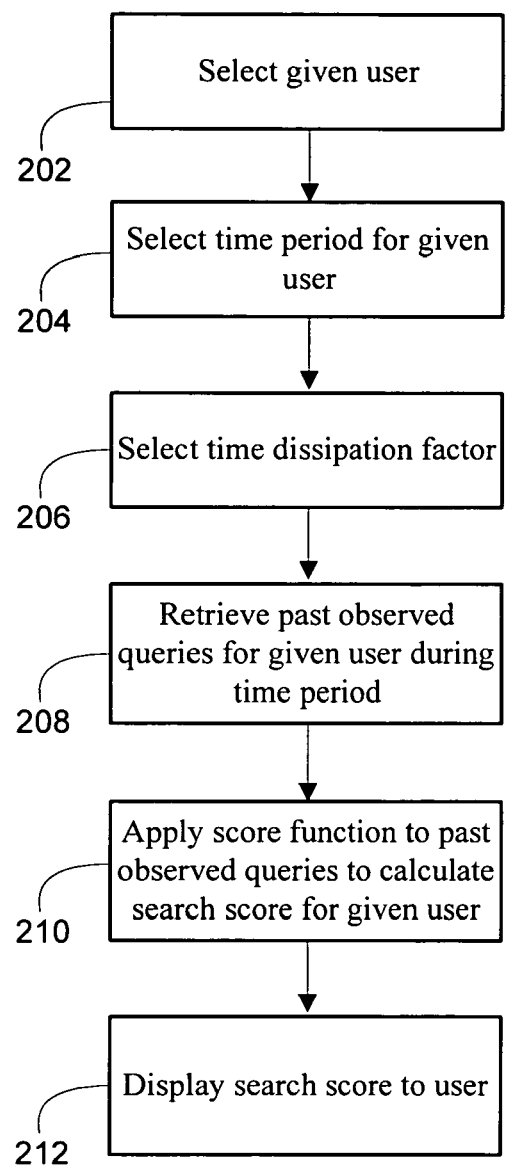
FIG. 2 is a flow diagram illustrating a method for the generation and presentation of a search score for a given user on the basis of searches that the user performs over a corpus of documents according to one embodiment of the present invention.

One embodiment of a method for operating the system presented in FIG. 1 for calculating and displaying a search score for a user is illustrated in FIG. 2. According to the flow diagram of FIG. 2, a method for calculating and displaying a search score for a user comprises the section of a given user from one or more users of the system, step 202. The search score for the given user may be calculated over one or more periods of time, e.g., calculating a search score for searches over the past day, week, month, year, etc. The system selects a time period over which the system calculates the search score for the given user, step 204. Alternatively, a system administrator or similar manager may set the time period over which the system calculates the search score. An optional time dissipation factor may also be set, step 206, either automatically or manually. The time dissipation factor allows for the process of FIG. 2 to account for periods of inactivity over which the user has not conducted any searches that were observed by the system, and modify the resultant search score accordingly.

For the given user during the time period, the system retrieves past observed queries, which may include information regarding the past observed queries, e.g., attributes, step 208. The resultant data set comprises information regarding the queries that the user has submitted to the search engine during the time period. The system applies a score function to the past observed queries to calculate a search score for the given user, step 210. Where the user has set a time dissipation factor according to step 206, the system applies the time dissipation factor to calculate a final search score for the user. Regardless of whether the system applies a time dissipation factor, the search score is displayed to the user, step 212, which may be in conjunction with a search page, a search results page, or other application or interface.

As discussed above, embodiments of the invention contemplate calculation of a search score for a user as a function of one or more scores associated with one or more respective sessions. According to the method of FIG. 3, calculation of a score for a session comprises selection of a given session, step 302, which may include accessing a user's profile. The system selects an attribute for the given session, step 304. Some exemplary attributes include, but are not limited to, the number of pages that a user saves from a result set, a type of query, the total number of queries in a given session, the number of items in a result set that the user selects, bid prices for keywords that are used to rank paid listings and a query category. Furthermore, a query type may include, but is not limited to, success (selection of at least one item in a result set responsive to a query, which increases search score), abandonment (no selection of any items in result set; no additional searches; this is negative with respect to search score), direct retry (user formulates a new query, which is also negative with respect to search score) and guided retry (using spelling and other retry mechanisms that the search engine or other component may provide, which is neutral to positive with respect to search score). For each of these attributes, a histogram may be calculated based on the measurements taken across all users. Accordingly, a point value or score between 1 and 100 is assigned to the attribute based on the percentiles across the histogram.

Each attribute is associated with a score ($A_k$), which is a value between 1 and 100, as well as a weight ($W_k$), such that $\Sigma W_{k=1}$. For the given attribute selected at step 304, the system calculates the product of the attribute score by the attribute weight ($A_k * W_k$), step 306. A check is performed to determine if additional attributes are present in the session, step 308. Where additional attributes are present, processing continues with the selection of a subsequent attribute, step 304. Where there are no additional attributes, step 308, the system calculates the sum of the products (step 306) for each attribute to determine a value for the given session, step 310. Expressed another way, where $V(s)$ is the value for a given session, then $V(s) = \text{sum}(A_k * W_k)$ over all attributes. A check is performed to determine if additional sessions are present in the profile of a given user that require the calculation of a score, step 312. Where additional sessions are present, step 312, processing continues with the selection of a subsequent session for scoring, step 302. If no additional sessions are present, step 312, processing is complete, which may include the persistent storage of the calculations, step 313.

Figure 3:
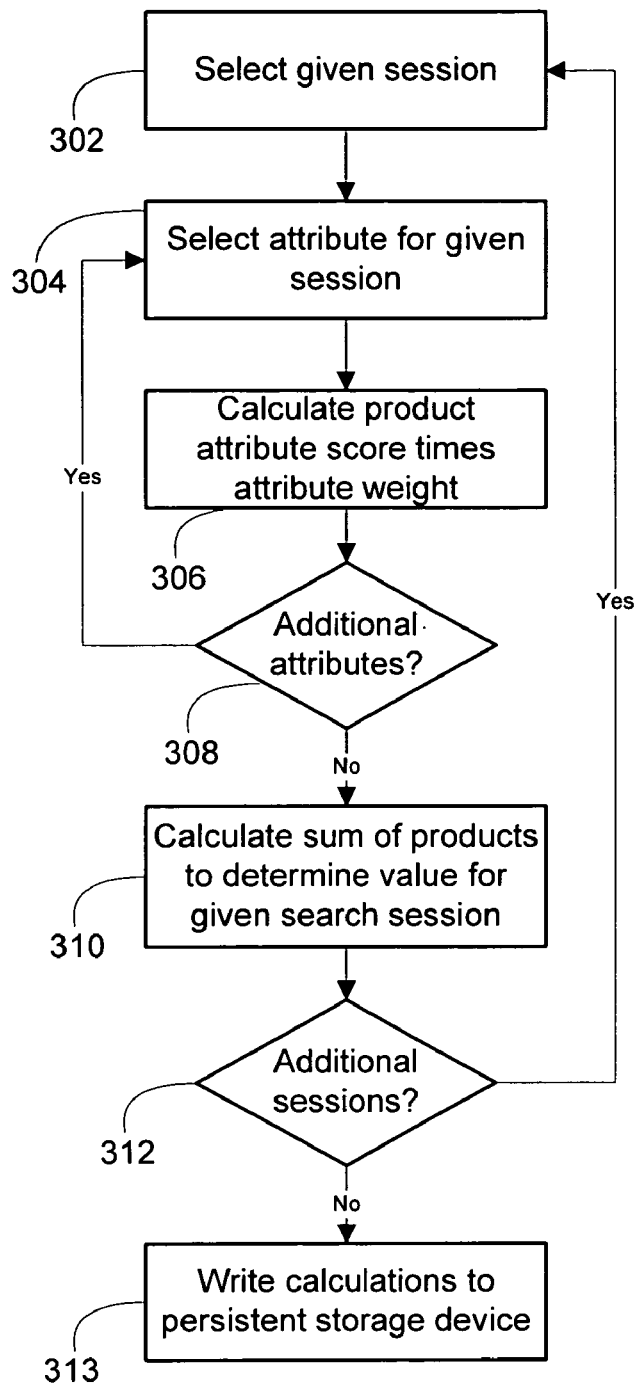
FIG. 3 is a flow diagram illustrating a method for the calculation of a score for one or more sessions according to one embodiment of the present invention.
Figure 4:
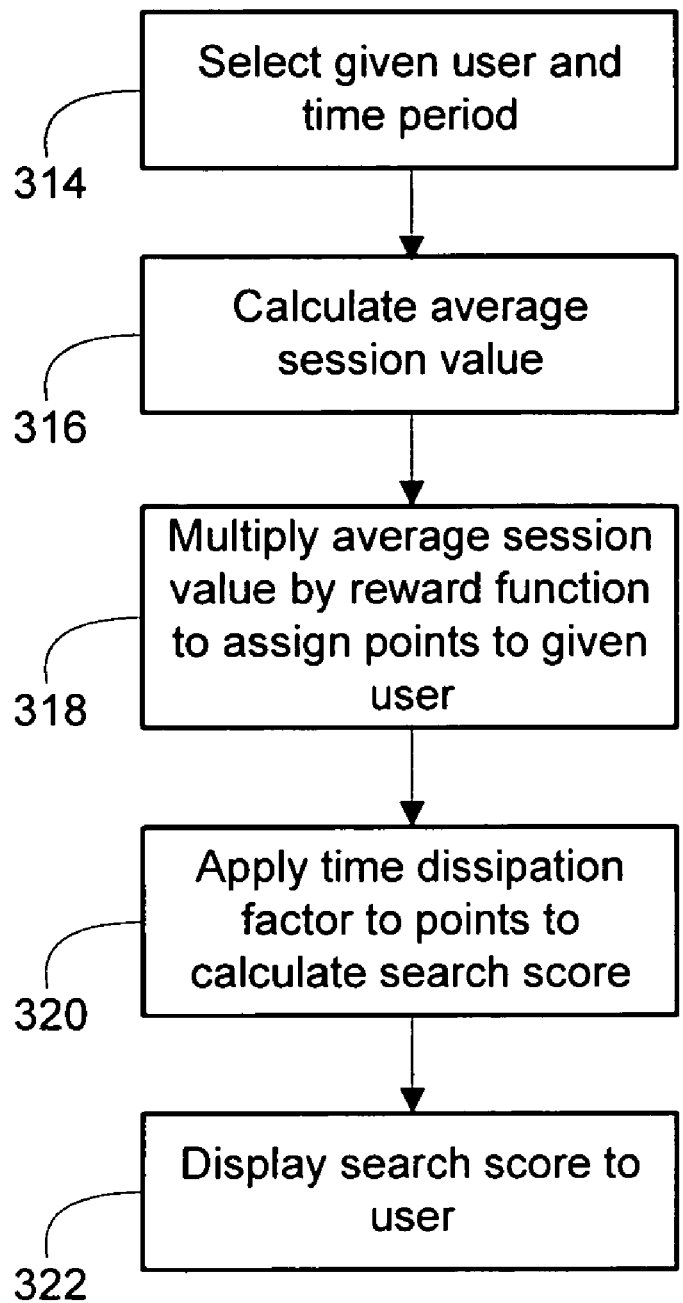
FIG. 4 is a flow diagram illustrating a method for the calculation of a search score for a given user on the basis of one or more search sessions according to one embodiment of the present invention.

The resultant score for the one or more sessions calculated by the method of FIG. 3 may be used to compute a search score for a given user according to the method of FIG. 4. The process of FIG. 4 begins with the selection of a given user and a time period over which the system is to calculate the search score, step 314. They system retrieves the scores for the user's sessions that are temporally within the time period and calculates an average session value (average ($V_s$)), step 316. The system multiplies the average session value by a reward function ($F(N)$) to assign a number of points to the user, step 318. According to one embodiment, the reward function is a multiplier set according to the number of sessions that the given user conducted in the time window. This may be derived according to the calculation of a histogram based on the measurements across all users. A value between 1 and 100 is set based on the percentiles across the histogram. Where $P(i,j)$ is a function that assigns points to user i over time period j, the value is derived according to Table 1:

TABLE 1

| $P(i, j) = \text{Average}(V(s)) * F(N)$ |
| --- |

The divisor 100 may be added to the function to ensure that the $P(i,j)$ is a value between 1 and 100.

A time dissipation factor (a) between 0 and 1 may be applied to the point assigning function $P(i,j)$ to calculate a search score for the given user over the time period, step 320

Accordingly, the search score for the given user may be derived according to the formula of Table 2:

TABLE 2

$(1 - a) * P(i, j) + a * P(i, j - 1)$

According to the formula of Table 2, the variable 'a' is a value between zero and one. The formula allows a score to dissipate over time, e.g., a user must actively use the system and formulate high scoring queries to prevent erosion of his or her search score. It should be noted by those of skill in the art that the time dissipation factor is an optional step in computing a search score for a given user.

Figure 5:
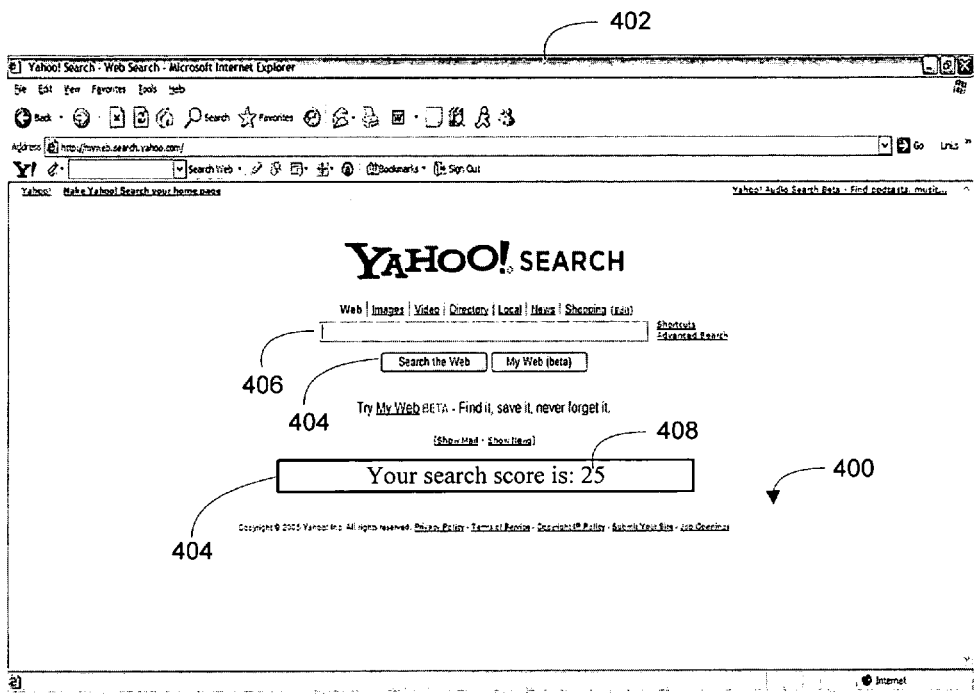
FIG. 5 is a screen diagram illustrating the presentation of a search score for a given user in conjunction with a search page according to one embodiment of the present invention.

The search score may be utilized in a number of ways to provide a user with feedback regarding the quality of the queries that they are performing through the use of the search engine. One exemplary use of a search score is illustrated by the screen diagram of FIG. 5. FIG. 5 illustrates a search page 400 transmitted by a search provider and rendered by a web browser 402 running on a client device. The search page 400 presents controls that allow the user to provide a search query 406, as well as submit 404 the search query to the search engine. The search page 400 prominently displays a search score box 404, inside of which the page 400 displays the user's search score 408.

Figure 6:
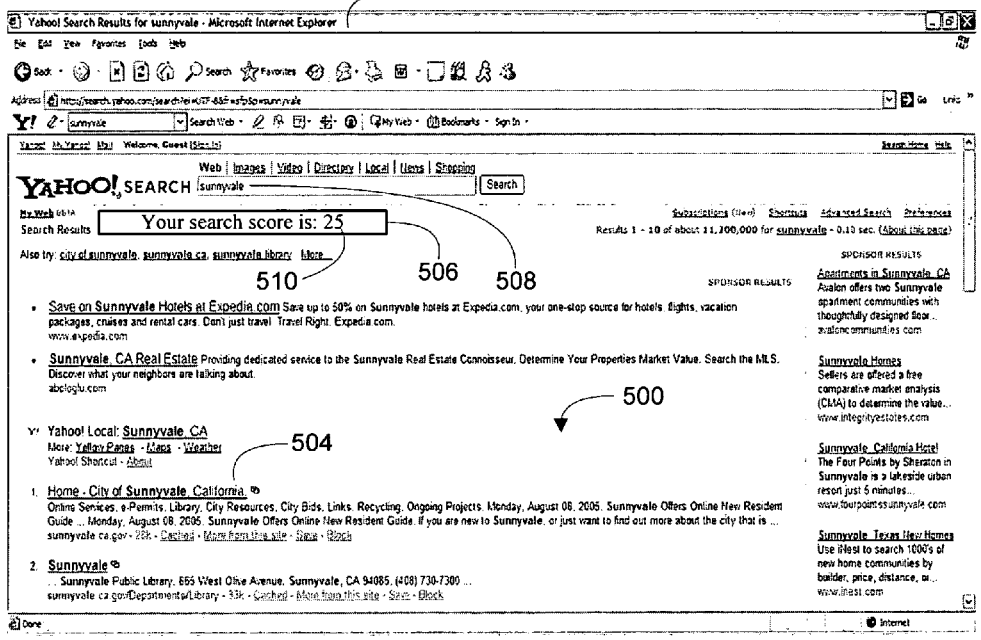
FIG. 6 is a screen diagram illustrating the presentation of a search score for a given user in conjunction with a search results page according to one embodiment of the present invention.

Another exemplary use of a search score is illustrated by the screen diagram of FIG. 6. FIG. 6 illustrates a search results page 500 transmitted by a search provider and rendered by a web browser 502 running on a client device. The search results page 500 presents the query 508 that the user provided to the search engine, as well as one or more search results 504, which may also be an empty set. The search results page 500 prominently displays a search score box 506, inside of which the page 500 displays the user's search score 510.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer-implemented method for the generation and presentation of a search score for a given user on the basis of searches that the given user performs over a corpus of documents, the method comprising:
    storing in a profile of the given user one or more query attributes, the query attributes comprising a query, information regarding the query, and information regarding the given user's use of a result set associated with the query;
    assigning one or more weights to the one or more query attributes on a random basis;
    selecting a time period over which to calculate the search score for the given user, the time period having a plurality of query sessions, each of the query sessions comprising a plurality of queries each associated with at least one of the one or more query attributes;
    applying a score function to each of the plurality of queries in each of the plurality of query sessions associated with the given user over the time period, wherein applying a score function comprises determining a product of a score value for the at least one of the one or more query attributes and the one or more weights associated with the one or more query attributes;
    calculating, using a processing device, a session score for each of the plurality of sessions, the session score comprising a sum of the product of the score value for the at least one of the one or more query attributes and the one or more weights for the one or more query attribute for each of the at least one of the one or more query attributes in a given session;
    calculating, using a processing device, a search score for the given user, the search score comprising an average of the session scores for the plurality of query sessions;
    assigning, using the processing device, the search score to the given user;
    displaying the search score to the given user; and
    rewarding the given user for an achievement of a particular search score.

2. The method of claim 1 comprising applying a time dissipation factor to the search score.

3. The method of claim 1 comprising selecting an attribute from a set consisting of a query type, a number of queries in a given session, a number of items that the user selects from a result set for a given query, and a category into which a given query falls.

4. The method of claim 1 wherein displaying the search score comprises displaying in conjunction with a search results page.

5. The method of claim 1 wherein displaying the search score comprises displaying in conjunction with a search query page.

6. The method of claim 1 wherein displaying the search score comprises displaying a grade that is derived from the search score.

7. The method of claim 1 comprising:
    executing a query by the given user through the use of a search query page provided by a search engine;
    storing one or more attributes of the query in a profile for the given user, the profile maintaining one or more attributes of past observed queries for the given user.

8. The method of claim 7 comprising:
    retrieving, from the profile for the given user, attributes of past observed queries for the given user;
    applying the score function to information regarding past observed queries for the given user to calculate an updated search score for the given user; and
    displaying the updated search score to the user.

9. The method of claim 1 comprising exposing the score calculation function to other applications through the use of an API.

10. The method of claim 9 comprising:
    interrogating the API by an application to generate a search score; and transmitting the search score to the application for display.

11. A system for the generation and presentation of a search score for a given user on the basis of searches that the given user performs over a corpus of documents, the system comprising at least one processing device operable to:
    store in a profile of the given user one or more query attributes, the query attributes comprising a query, information regarding the query, and information regarding the given user's use of a result set associated with the query;
    assign one or more weights to the one or more query attributes on a random basis;
    select a time period over which to calculate the search score for the given user, the time period having a plurality of query sessions, each of the query sessions comprising a plurality of queries each associated with at least one of the one or more query attributes;

apply a score function to each of the plurality of queries in each of the plurality of query sessions associated with the given user over the time period, wherein applying a score function comprises determining a product of a score value for the at least one of the one or more query attributes and the one or more weights associated with the one or more query attributes;

calculate, using a processing device, a session score for each of the plurality of sessions, the session score comprising a sum of the product of the score value for the at least one of the one or more query attributes and the one or more weights for the one or more query attribute for each of the at least one of the one or more query attributes in a given session;

calculate a search score for the given user, the search score comprising an average of the session scores for the plurality of query sessions;

assigning, using the processing device, the search score to the given user;

displaying the search score to the given user; and rewarding the given user for an achievement of a particular search score.

12. The system of claim 11, the at least one processing device further operable to apply a time dissipation factor to the search score.

13. The system of claim 11, the at least one processing device further operable to select an attribute from a set consisting of a query type, a number of queries in a given session, a number of items that the user selects from a result set for a given query, and a category into which a given query falls.

14. The system of claim 11, the at least one processing device further operable to display the search score in conjunction with at least one of a search results page and a search query page.

15. The system of claim 11, the at least one processing device further operable to display a grade that is derived from the search score.

16. The system of claim 11, the at least one processing device further operable to:
execute a query by the given user through the use of a search query page provided by a search engine; and
store one or more attributes of the query in a profile for the given user, the profile maintaining one or more attributes of past observed queries for the given user.

17. The system of claim 16, the at least one processing device further operable to:
retrieve, from the profile for the given user, attributes of past observed queries for the given user;
apply the score function to information regarding past observed queries for the given user to calculate an updated search score for the given user; and
display the updated search score to the user.

18. A non-transitory computer readable medium having executable code stored thereon that when executed causes a processing device to perform a method for the generation and presentation of a search score for a given user on the basis of searches that the given user performs over a corpus of documents, the method comprising:
storing in a profile of the given user one or more query attributes, the query attributes comprising a query, information regarding the query, and information regarding the given user's use of a result set associated with the query;
assigning one or more weights to the one or more query attributes on a random basis;
selecting a time period over which to calculate the search score for the given user, the time period having a plurality of query sessions, each of the query sessions comprising a plurality of queries each associated with at least one of the one or more query attributes;
applying a score function to each of the plurality of queries in each of the plurality of query sessions associated with the given user over the time period, wherein applying a score function comprises determining a product of a score value for the at least one of the one or more query attributes and the one or more weights associated with the one or more query attributes;
calculating a session score for each of the plurality of sessions, the session score comprising a sum of the product of the score value for the at least one of the one or more query attributes and the one or more weights for the one or more query attribute for each of the at least one of the one or more query attributes in a given session;
calculating a search score for the given user, the search score comprising an average of the session scores for the plurality of query sessions;
assigning the search score to the given user;
displaying the search score to the given user; and
rewarding the given user for an achievement of a particular search score.

19. The non-transitory computer readable of claim 18, the method comprising:
executing a query by the given user through the use of a search query page provided by a search engine;
storing one or more attributes of the query in a profile for the given user, the profile maintaining one or more attributes of past observed queries for the given user.

20. The non-transitory computer readable of claim 19, the method comprising:
retrieving, from the profile for the given user, attributes of past observed queries for the given user;
applying the score function to information regarding past observed queries for the given user to calculate an updated search score for the given user; and
displaying the updated search score to the user.

* * * * *